(12) United States Patent
Lee

(10) Patent No.: US 11,230,873 B2
(45) Date of Patent: Jan. 25, 2022

(54) TRUNK DOOR OPENING/CLOSING ASSISTANCE APPARATUS AND METHOD

(71) Applicant: Continental Automotive GmbH, Hannover (DE)

(72) Inventor: TaeHoon Lee, Singapore (SG)

(73) Assignee: Continental Automotive GmbH

( * ) Notice: Subject to any disclaimer, the term of this patent is extended or adjusted under 35 U.S.C. 154(b) by 78 days.

(21) Appl. No.: 16/630,661

(22) PCT Filed: Jul. 20, 2018

(86) PCT No.: PCT/KR2018/008230
§ 371 (c)(1),
(2) Date: Jan. 13, 2020

(87) PCT Pub. No.: WO2019/017729
PCT Pub. Date: Jan. 24, 2019

(65) Prior Publication Data
US 2021/0148155 A1 May 20, 2021

(30) Foreign Application Priority Data
Jul. 21, 2017 (KR) .................. 10-2017-0092698

(51) Int. Cl.
*E05F 15/00* (2015.01)
*E05F 15/70* (2015.01)
(Continued)

(52) U.S. Cl.
CPC .............. *E05F 15/70* (2015.01); *B60J 5/10* (2013.01); *E05F 15/611* (2015.01);
(Continued)

(58) Field of Classification Search
CPC . B60J 5/10; E05F 15/611; E05F 15/70; E05F 15/41; E05Y 2400/40;
(Continued)

(56) References Cited

U.S. PATENT DOCUMENTS

2008/0222964 A1 9/2008 Longuemare et al.
2015/0233167 A1* 8/2015 Natsui ............... E05F 15/70
701/49
(Continued)

FOREIGN PATENT DOCUMENTS

DE 102006019581 A1 10/2007
DE 102007062472 A1 6/2009
(Continued)

OTHER PUBLICATIONS

International Search Report and Written Opinion for International Application No. PCT/KR2018/008230, dated Dec. 3, 2018, 9 pages.
(Continued)

*Primary Examiner* — Chi Q Nguyen
(74) *Attorney, Agent, or Firm* — RatnerPrestia

(57) ABSTRACT

A trunk door opening/closing assistance apparatus including: a torque detection part which detects a torque input by a user to open/close the trunk door of a vehicle; a control unit which provides assist torque support in addition to the torque applied by the user within a total torque range required to open/close the door when the user manually opens or closes the trunk door; and a motor drive part which drives a motor for assisting the opening or closing of the trunk door with a direction and a strength which are controlled by the control unit.

14 Claims, 4 Drawing Sheets

(51) Int. Cl.
    *E05F 15/611*     (2015.01)
    *B60J 5/10*     (2006.01)

(52) U.S. Cl.
    CPC ..... *E05Y 2201/434* (2013.01); *E05Y 2400/31* (2013.01); *E05Y 2400/354* (2013.01); *E05Y 2400/40* (2013.01); *E05Y 2400/44* (2013.01); *E05Y 2400/45* (2013.01); *E05Y 2800/113* (2013.01); *E05Y 2900/548* (2013.01)

(58) Field of Classification Search
    CPC ............ E05Y 2400/44; E05Y 2400/45; E05Y 2201/434; E05Y 2400/31; E05Y 2900/548; E05Y 2800/113; E05Y 2400/354; E05Y 2800/112; B62D 25/12
    USPC .......................................................... 49/31
    See application file for complete search history.

(56) References Cited

U.S. PATENT DOCUMENTS

| | | | |
|---|---|---|---|
| 2015/0280635 A1 | 10/2015 | Fujimoto et al. | |
| 2016/0053524 A1* | 2/2016 | Serban | E05F 15/43 701/49 |
| 2016/0265263 A1* | 9/2016 | Motoki | B60R 25/2054 |
| 2017/0030131 A1 | 2/2017 | Elie et al. | |
| 2017/0342791 A1* | 11/2017 | Lehr | E21B 29/00 |
| 2018/0163454 A1* | 6/2018 | Motoki | B60R 25/2054 |
| 2019/0162822 A1* | 5/2019 | Rafrafi | B60Q 9/00 |
| 2019/0226262 A1* | 7/2019 | Tsuboi | E05F 15/616 |
| 2020/0040638 A1* | 2/2020 | Ohashi | E05F 15/73 |
| 2021/0180388 A1* | 6/2021 | Joko | E05F 15/622 |

FOREIGN PATENT DOCUMENTS

| | | |
|---|---|---|
| DE | 102010023398 A1 | 12/2011 |
| DE | 102014225150 A1 | 6/2016 |
| EP | 1970519 A1 | 9/2008 |
| JP | 2007238014 A | 9/2007 |
| JP | 2017020267 A | 1/2017 |
| KR | 100488505 B1 | 5/2005 |
| KR | 20150141444 A | 12/2015 |
| KR | 101754015 B1 | 7/2017 |
| WO | 2007004416 A1 | 1/2007 |
| WO | 2017083706 A1 | 5/2017 |

OTHER PUBLICATIONS

German Office Action for German Application No. 11 2018 003 727.4, dated Jul. 22, 2021 with translation, 10 pages.
Chinese Office Action for Chinese Application No. 201880048734.3, dated Aug. 31, 2021 with translation, 21 pages.

* cited by examiner

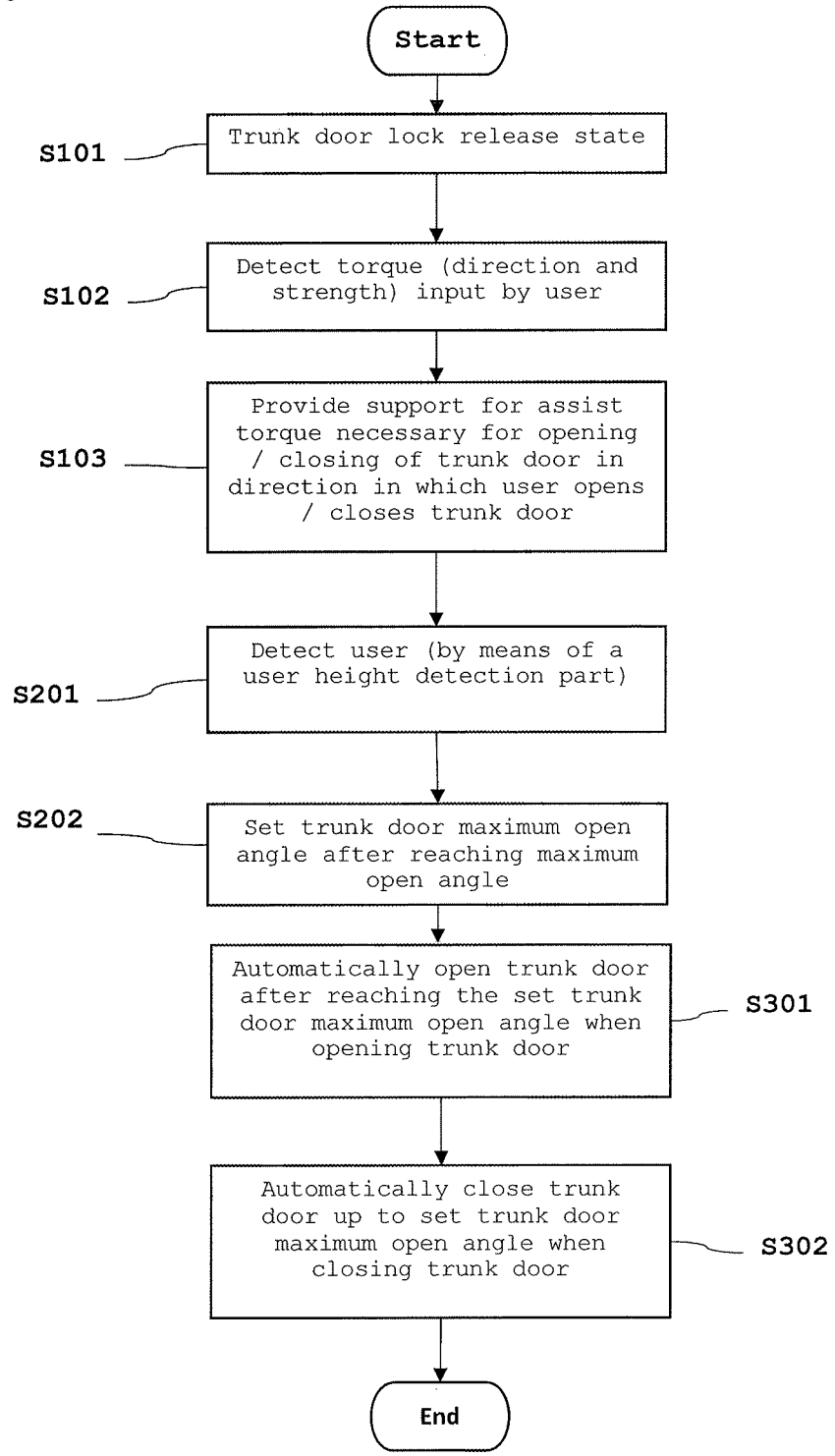

TRUNK DOOR OPENING/CLOSING ASSISTANCE APPARATUS AND METHOD

CROSS REFERENCE TO RELATED APPLICATIONS

This application is the U.S. National Phase Application of PCT International Application No. PCT/KR2018/008230, filed Jul. 20, 2018, which claims priority to Korean Patent Application No. 10-2017-0092698, filed Jul. 21, 2017, the contents of such applications being incorporated by reference herein.

FIELD OF THE INVENTION

The present invention relates to trunk door opening/closing assistance apparatus and method, and more particularly, to trunk door opening/closing assistance apparatus and method which allows a user to open the trunk door with less force or effort required, by providing force assistance to the user when the user manually opens and closes the trunk door of a vehicle.

BACKGROUND OF THE INVENTION

Generally, a trunk door is installed at the tail of a vehicle, and conventionally, the trunk door can only be opened and closed manually. However, recently, as vehicles equipped with electrically driven trunk doors are released, the trunk doors can be simply opened and closed through a button input.

Here, since the manual-type trunk door should be opened and closed by using only the user's force, there is a problem in that women or elderly and weak people cannot easily open the trunk door. Also, there is a problem in that the electrically driven trunk door has the convenience of being openable and closable without the user's touch by the hand, but the trunk door is opened at a constant speed (a speed lower than the speed at which a common adult man manually opens and closes a trunk door) for safety, and therefore the user is irritated and bored while the trunk door is opened/closed.

That is, the electrically-driven trunk door has a problem in that although, around the trunk door, there are no people or objects that can collide with the trunk door, the trunk door is always opened/closed at only a constant speed, and therefore the user is irritated and bored while the trunk door is opened/closed.

The background art of the present invention is disclosed in Korean Patent No. 10-0488505 (Filed on Apr. 30, 2005, Title of the Invention: CONTROLLING METHOD FOR OPENING AND CLOSING A TRUNK DOOR OF VEHICLE), incorporated herein by reference.

SUMMARY OF THE INVENTION

An aspect of the present invention has been made to solve the above problems, and to provide a trunk opening/closing assistance apparatus and method which allows a user to open the trunk door with less force or effort by providing force assistance to the user when the user manually opens and closes the trunk door of a vehicle.

A trunk door opening/closing assistance apparatus according an aspect of the present invention is characterized by including: a torque detection part which detects a torque input by a user to open/close the trunk door of a vehicle; a control unit which provides assist torque support in addition to the torque applied by the user within a total torque range required to open/close the door when the user manually opens or closes the trunk door; and a motor drive part which drives a motor for assisting the opening/closing of the trunk door with a direction and a strength which are controlled by the control unit.

An aspect of the present invention is characterized in that the control unit may provide support for an assist torque which is a remainder of subtracting a manual force input by the user from the total torque required to open/close the trunk door.

An aspect of the present invention is characterized in that the torque detection part may detect a direction and strength of the torque input by the user, and the direction of the torque input by the user may be either a direction of opening the trunk door or a direction of closing the trunk door.

An aspect of the present invention is characterized by further including: an angle detection part which detects an angle of the trunk door opened/closed by the user; and a user height detection part which detects a height of the user who opens or closes the trunk door, wherein when the height of the user is detected, the control unit may set a maximum open angle of the trunk door corresponding to the height of the user, and when the user opens the trunk door, the control unit may stop to provide support for the assist torque after the open angle of the trunk door reaches the set maximum open angle of the opened trunk door.

An aspect of the present invention is characterized in that the angle detection part may detect the angle of the trunk door opened/closed between a maximum closed angle when the trunk door is in a lock state and a maximum open angle when the trunk door is in an open state.

An aspect of the present invention is characterized in that when the trunk door is opened by means of at least one sensor installed on the trunk door, the user height detection part may detect a height up to the top of the head of the user or a height up to an end of an upwardly stretched hand of the user.

A trunk door opening/closing assistance method according to another aspect of the present invention is characterized by including: detecting a torque input by a user to open/close a trunk door of a vehicle; a control providing assist torque support in addition to the torque input by the user within a total torque range required to open/close the door when the user manually opens/closes the trunk door; and a motor drive part driving a motor for assisting the opening/closing of the trunk door according to a direction and a strength which are controlled by the control unit.

An aspect of the present invention is characterized in that the control unit may provide support for an assist torque which is a remainder of subtracting a manual force input by the user from the total torque required to open/close the trunk door.

An aspect of the present invention is characterized by further including: an angle detection part detecting an angle of the trunk door opened/closed by a user when the user manually opens/closes the trunk door; and a user height detection part detecting a height of the user who opens or closes the trunk door, wherein when the height of the user is detected, the control unit may set a maximum open angle of the trunk door corresponding to the height of the user, and when the user opens the trunk door, the control unit may stop to provide the support for the assist torque after the open angle of the trunk door reaches the set maximum open angle of the opened trunk door.

An aspect of the present invention is characterized in that the angle detection part may detect the angle of the trunk door opened/closed between a maximum closed angle when the trunk door is in a lock state and a maximum open angle when the trunk door is in an open state.

An aspect of the present invention is characterized in that when the trunk door is opened by means of at least one sensor installed on the trunk door, the user height detection part may detect a height up to the top of the head of the user or a height up to an end of an upwardly stretched hand of the user.

An aspect of the present invention is characterized in that when a torque is not input by the user while the trunk door is opened and closed by providing the assist torque support, the control unit may stop the assist torque support to stop the opening/closing of the trunk door.

An aspect of the present invention is characterized in that: when the assist torque support is provided to open and close the trunk door, the control unit may detect the height of the user who opens and closed the user, and set a maximum open angle of the trunk door corresponding to the height of the user; when the trunk door is opened by the user, the control unit may set, by means of the assist torque, a total torque for opening the trunk door up to a maximum angle after the set trunk door maximum open angle is reached and thereby automatically open the trunk door up to a maximum angle; and when the user intends to close the trunk door, the control unit may automatically close the trunk door opened up to the maximum open angle set by taking into account the height of the user.

An aspect of the present invention is characterized in that the control unit may determine a case of closing the trunk door by a user by detecting at least one user's input of a trunk button in a vehicle remote controller, user's touch of a specific position in the trunk, and an elapse of a specific time after the trunk is opened up to the maximum open angle.

According to an aspect of the present invention, when a user manually opens and closes the trunk door of a vehicle, an aspect of the present invention allows the user to open the trunk door even with less force by providing the user with an assist torque support.

BRIEF DESCRIPTION OF THE DRAWINGS

FIG. 5 is a flowchart for illustrating a trunk door opening/closing assistance method according to a third embodiment of the present invention.

DETAILED DESCRIPTION OF THE PREFERRED EMBODIMENTS

Figure 1:
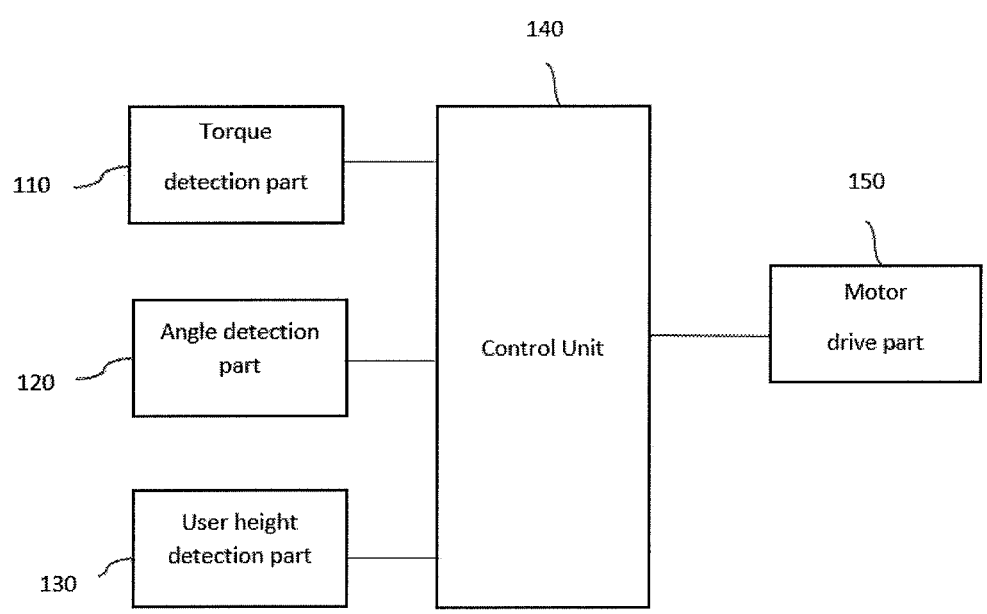
FIG. 1 is an exemplary view illustrating a schematic configuration of a trunk door opening/closing assistance apparatus according to an embodiment of the present invention.

Hereinafter, embodiments of trunk door opening/closing assistance apparatus and method according to an aspect of the present invention will be described with reference to the accompanying drawings.

In the description, the thicknesses of the lines and the sizes of the components illustrated in the drawings may be exaggerated for clarity and convenience of explanation. Also, the following terms are terms defined in consideration of functions according to an aspect of the present invention and thus may be changed according to the intention or usage of a user or operator. Therefore, definitions of these terms should be made based on the contents throughout this specification.

FIG. 1 is an exemplary view illustrating a schematic configuration of a trunk door opening/closing assistance apparatus according to an embodiment of the present invention.

As illustrated in FIG. 1, a trunk door opening/closing assistance apparatus according to an embodiment of the present invention includes a torque detection part (110), an angle detection part (120), a user height detection part (130), a control unit (140), and a motor drive part (150).

The torque detection part (110) detects a torque input by a user to open/close a trunk door.

The torque detection part (110) detects the direction and strength of a torque input by the user. Here, the direction of the torque input by the user is either the direction of opening the trunk door or the direction of closing the trunk door.

The angle detection part (120) detects the angle of the trunk door opened/closed by the user.

The angle detection part (120) detects the angle of the trunk door opened/closed between an angle (maximum closed angle) when the trunk door is in a lock state, and an angle (maximum open angle) when the trunk door is in a completely opened state.

The user height detection part (130) detects the height up to the top of the head of the user or the height up to the end of the upwardly stretched hand of the user.

For example, the user height detection part (130) detects the height up to the top of the head of the user or the height up to the end of the upwardly stretched hand of the user when the trunk door is opened by means of at least one sensor (e.g., an infrared sensor, an ultrasonic sensor, a camera sensor, or a touch sensor) installed on the trunk door (e.g., on a corner or a handle).

The control unit (140) provides support for an assist torque within a torque range required to open/close the trunk door in addition to a torque input by the user when the user manually opens/closes the trunk door.

Figure 2:
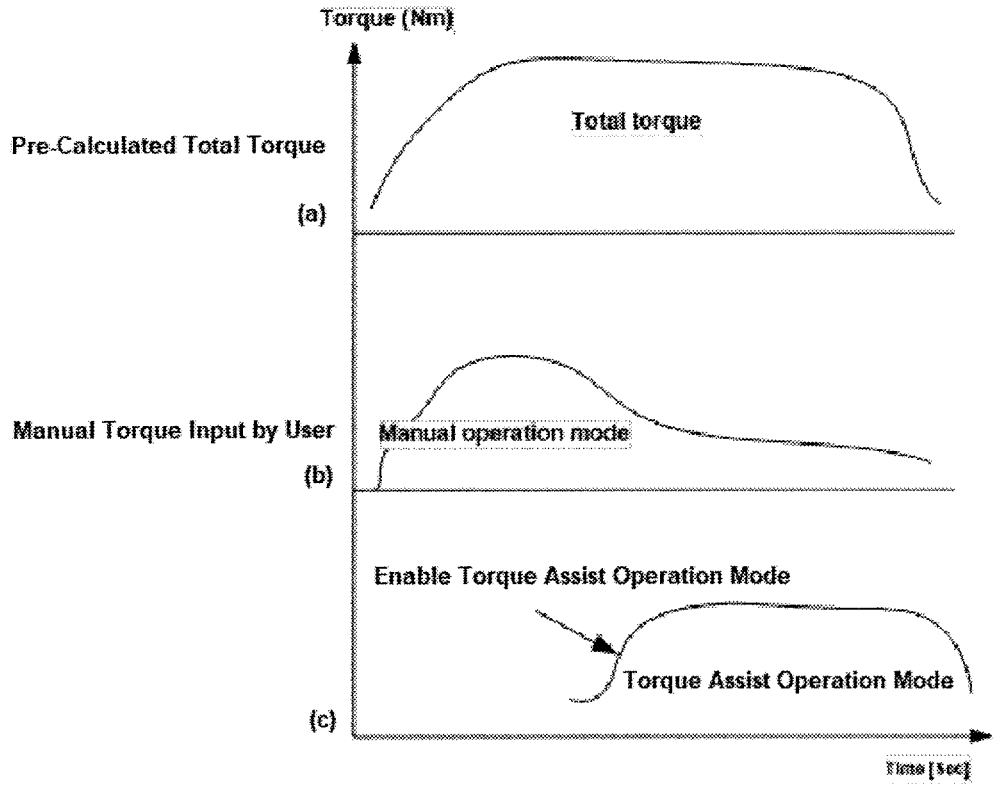
FIG. 2 is an exemplary view for illustrating a method for calculating an assist torque corresponding to a torque input by a user in FIG. 1.

FIG. 2 is an exemplary view for illustrating a method for calculating an assist torque corresponding to a torque input by a user in FIG. 1, and the control unit (140) provides support for an assist torque (see (c) of FIG. 2) which is a remainder of subtracting a manual force (see (b) of FIG. 2) input by the user from a total torque (see (a) of FIG. 2) required to open/close the trunk door.

For example, as shown in equations 1 and 2 below, the control unit (140) may calculate the total torque (PRE_Calculated_Total_Torque) by adding the manual force (Torque_Manual_Operation_Mode) manually input by the user and the assist torque (Torque_Assist_Operation_Mode), and calculate the assist torque (Torque_Assist_Operation_Mode) by subtracting an actual manual force (Torque_Manual_Operation_Mode) input by the user from the total torque (PRE_Calculated_Total_Torque). However, equations 1 and 2 below are exemplarily described to understand the assist torque calculation method. Therefore, the assist torque may also be calculated through another method.

$$PRE\_Calculated\_Total\_Torque = \int_0^{11} Torque\_Manual\_Operation\_Mode \cdot dt + \int_0^{12} Torque\_Assist\_Operation\_Mode \cdot dt \quad \text{[Equation 1]}$$

$$Estimated\_Assus\_Torque = Pre\_Calculated\_Total\_Torque - \int_0^{11} Torque\_Manual\_Operation\_Mode \cdot dt \quad \text{[Equation 2]}$$

The control unit (140) controls the motor drive part (150) with a direction and strength corresponding to the calculated assist torque. The motor drive part (150) controls a motor (not shown) which assists the opening/closing of the trunk door with the direction and strength which are controlled by the control unit (140).

Hereinafter the operation of the control unit (140) will be described in more detail with reference to FIGS. 3 to 5.

Figure 3:
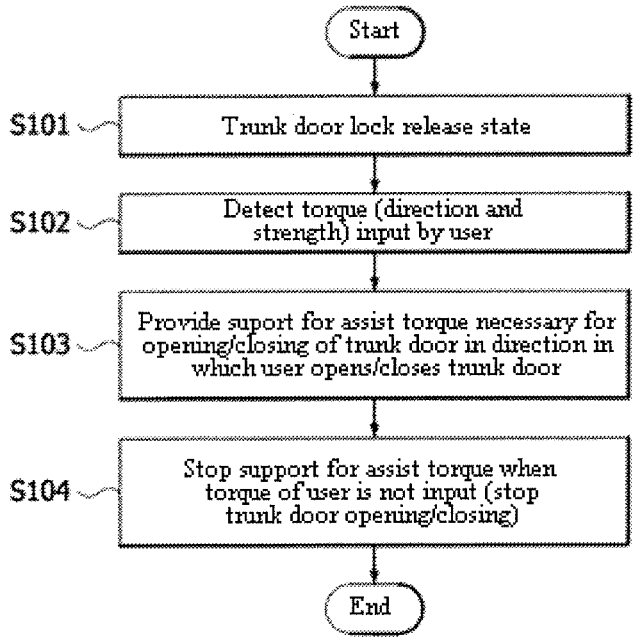
FIG. 3 is a flowchart for illustrating a trunk door opening/closing assistance method according to a first embodiment of the present invention.

FIG. 3 is a flowchart for illustrating a trunk door opening/closing assistance method according to a first embodiment of the present invention.

As illustrated in FIG. 3, a control unit (140) detects (S102) the direction and strength which are input by a user in a state in which the lock of a trunk door is released (S101).

The control unit (140) provides support for an assist torque, corresponding to the detected direction and strength which are input by the user, required to open/close the trunk door in the direction in which the user opens/closes the trunk door (S103).

That is, the control unit (140) controls the motor drive part (150) with the direction and strength corresponding to the calculated assist torque.

As described above, when the torque of the user is not input while the trunk door is opened/closed by providing support for an assist torque, the control unit (140) stops to provide the support for the assist torque (S104).

As soon as the support for the assist torque is stopped, the opening/closing of the trunk door is stopped. That is, opening/closing of the trunk door is controlled at an angle desired by the user. Accordingly, there is an effect in that the opening/closing of the trunk door may be controlled corresponding to conditions (e.g., a case in which an obstacle is present on the ceiling) of a place in which the trunk is opened.

This characteristic (the characteristic of opening/closing the trunk door at an angle desired by the user) described above is a characteristic which is not supported in an electrically-driven trunk door, and even if the characteristic can be supported, the support should be implemented by an on/off operation of a button (trunk door opening/closing button) (not shown). Therefore, it may be sufficiently expected that the response of the support be degraded.

Figure 4:
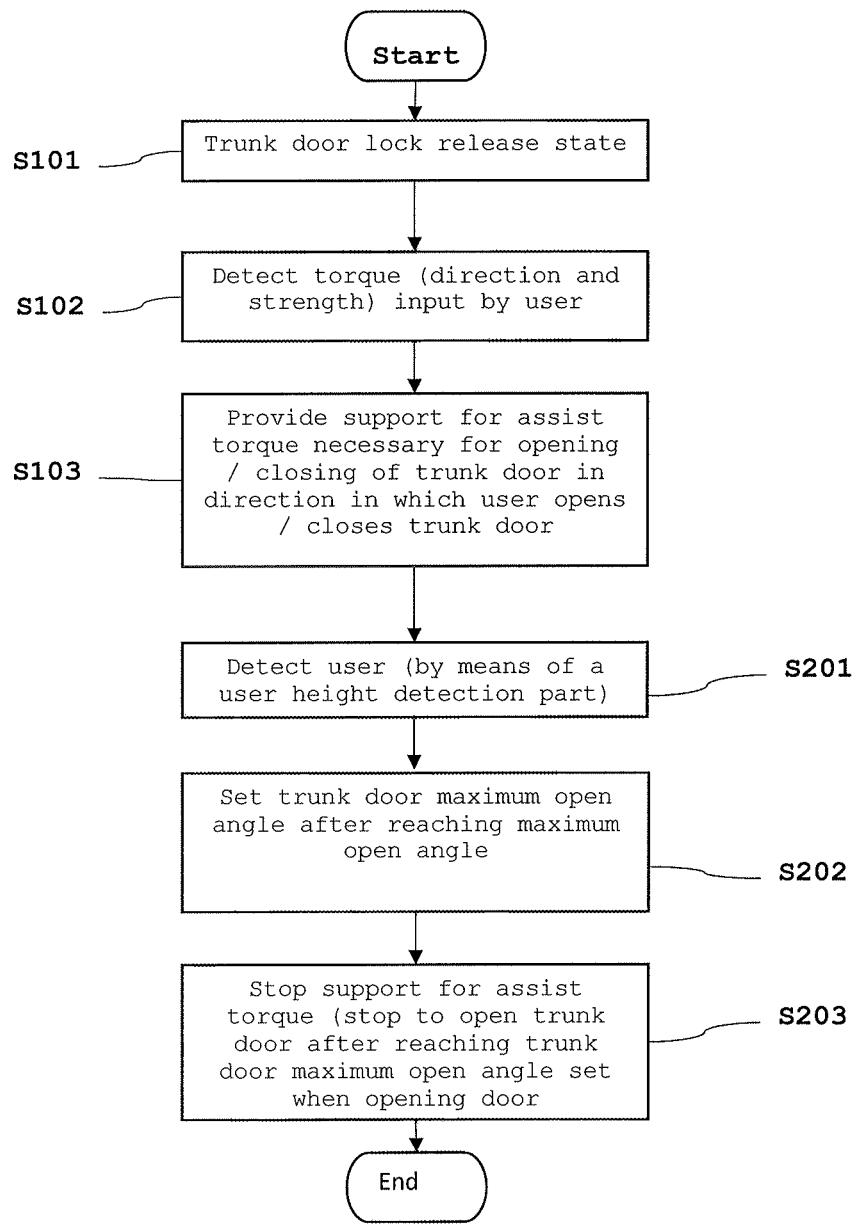
FIG. 4 is a flowchart for illustrating a trunk door opening/closing assistance method according to a second embodiment of the present invention.

FIG. 4 is a flowchart for illustrating a trunk door opening/closing assistance method according to a second embodiment of the present invention, and some steps (S201 to S203) are further provided and implemented in the flowchart illustrated in FIG. 3.

As illustrated in FIG. 4, a control unit (140) detects (S102) the direction and strength of a torque input by a user in a state in which the lock of a trunk door is released (S101), and provides support for an assist torque necessary for the opening/closing of the trunk door in the direction in which the user opens/closes the trunk door according to the direction and strength which are input by the user (S103), and while the trunk door is opened/closed, the control unit (140) detects the height of the user who opens/closes the trunk door by means of a user height detection part (130) (S201).

For example, it is necessary to restrict, according to the type of vehicle, a maximum height at which the trunk door can be opened corresponding to the height of the user according to whether the vehicle is a compact car (e.g., light-weight car) or a full-size car (e.g., SUV) with a high trunk door position.

Here, the height of the user to be detected may be set on the basis of any one of the height up to the top of the head of the user or the height up to the upwardly stretched hand of the user.

As described above, when the height of the user is detected, the control unit (140) sets a trunk door maximum open angle corresponding to the height of the user (S202).

The trunk door maximum open angle corresponding to the height of the user may be stored in advance into an internal memory (not shown) in a lookup table shape.

As illustrated above, when the trunk door maximum open angle is set, and when the trunk is opened by the user, the control unit (140) stops the support for an assist torque after the angle of the opened trunk door reaches the trunk door maximum open angle (S203).

As soon as the support for the assist torque is stopped, the opening of the trunk door is stopped. However, the trunk door can be opened further by the manual force of the user, but the trunk door is in a sufficiently opened state taking into account the height of the user, and it may be difficult to close the trunk door when the trunk door is opened further higher. Therefore, it is highly likely that the user also does not further open the trunk door.

Here, when the trunk door is lower than the height of the user even though maximally opened, a situation in which the support for an assist torque is stopped when opening the trunk door may not occur.

FIG. 5 is a flowchart for illustrating a trunk door opening/closing assistance method according to a third embodiment of the present invention, and some steps (S301 to S302) are further provided and implemented in the flowchart illustrated in FIG. 4.

As illustrated in FIG. 5, a control unit (140) detects (S102) the direction and strength of a torque input by a user in a state in which the lock of a trunk door is released (S101), and provides support for an assist torque necessary for the opening/closing of the trunk door in the direction in which the user opens/closes the trunk door according to the direction and strength which are input by the user (S103), and while the trunk door is opened/closed, the control unit (140) may detect the height of the user who opens/closes the trunk door through a user height detection part (130) (S201), and set a trunk door maximum open angle corresponding to the height of the user (S202).

As described above, when the trunk maximum open angle is set, and the control unit (140), when the trunk door is opened by the user, automatically opens the trunk door to a maximum open angle by setting the assist torque to a total torque (a total torque for opening the trunk door to a maximum angle) after the angle of the opened trunk door reaches the set trunk door maximum open angle (S301).

In addition, when the user intends to close the trunk door (e.g., when the user selects a trunk button in a vehicle remote controller, touches a designated specific position of a trunk, or detects an elapse of designated specific time, the control unit (140) automatically closes the trunk door which has actually been opened to the set trunk door maximum open angle (that is, the maximum open angle set by taking into account the height of the user) (S302).

Accordingly, the user may manually open/close the trunk door by receiving support for an assist torque from the control unit (140).

As described above, the present embodiment has an effect of improving convenience by semi-automatically controlling the opening/closing of the trunk door such that the user may be less irritated or bored than when electrically operating the trunk door, and allowing the user, who is used to manual opening/closing of the trunk door, to feel safety (e.g., feeling of accurate opening/closing) according to the opening/closing of the trunk door.

So far, an aspect of the present invention has been described with reference to embodiments illustrated in the drawings. However, the description of an aspect of the present invention is intended to be illustrative, and those with ordinary skill in the technical field to which an aspect of the present invention pertains will understand that the present invention can be carried out in other specific forms without changing the technical idea or essential features. Hence, the technical protective scope of an aspect of the present invention shall be determined by the technical scope of the accompanying claims.

The invention claimed is:

1. A trunk door opening/closing assistance apparatus for a vehicle comprising:
    a torque detection part adapted to detect a torque applied by a user in response to the user manually opening or closing the trunk door of the vehicle;
    a control unit adapted to provide assist torque support in addition to the torque applied by the user within a total torque range required to open or close the trunk door in response to the user manually opening or closing the trunk door; and
    a motor drive part adapted to drive a motor for assisting the opening or closing the trunk door with a direction and a strength which are controlled by the control unit.

2. The trunk door opening/closing assistance apparatus as claimed in claim 1, wherein the control unit provides support for an assist torque which is a remainder of subtracting a manual force applied by the user from the total torque required to open or close the trunk door.

3. The trunk door opening/closing assistance apparatus as claimed in claim 1, wherein the torque detection part is further adapted to detect a direction and a strength of the torque applied by the user, and
    the direction of the torque input by the user is either a direction of opening the trunk door or a direction of closing the trunk door.

4. The trunk door opening/closing assistance apparatus as claimed in claim 1, further comprising:
    an angle detection part adapted to detect an angle of the trunk door opened or closed by the user; and
    a user height detection part comprising at least one sensor installed on the trunk door adapted to detect a height of the user who opens or closes the trunk door, wherein
    in response to the height of the user being detected, the control unit sets a maximum open angle of the trunk door corresponding to the height of the user, and when the user opens the trunk door, the control unit stops to provide support for the assist torque after the open angle of the trunk door reaches the set maximum open angle of the trunk door.

5. The trunk door opening/closing assistance apparatus as claimed in claim 4, wherein the angle detection part detects the angle of the trunk door between a maximum closed angle when the trunk door is in a lock state, and a maximum open angle when the trunk door is in an open state.

6. The trunk door opening/closing assistance apparatus as claimed in claim 4, wherein in response to the trunk door being opened, the user height detection part detects, by the at least one sensor installed on the trunk door, a height up to the top of the head of the user or a height up to an end of an upwardly stretched hand of the user.

7. A trunk door opening/closing assistance method comprising:
    detecting a torque applied by a user to in response to the user manually opening or closing a trunk door of a vehicle;
    providing, by a control unit, an assist torque support in addition to the torque applied by the user within a total torque range required to open or close the door in response to the user manually opening or closing the trunk door; and
    driving a motor, by a motor drive part, for assisting the opening or closing of the trunk door according to a direction and a strength which are controlled by the control unit.

8. The trunk door opening/closing assistance method of claim 7, wherein the assist torque provided by the control unit is a remainder of subtracting a manual force applied by the user from the total torque required to open or close the trunk door.

9. The trunk door opening/closing assistance method as claimed in claim 7, further comprising:
    detecting, by an angle detection part, an angle of the trunk door opened or closed by the user when the user manually opens or closes the trunk door; and
    detecting, by a user height detection part, a height of the user who opens or closes the trunk door, wherein
    in response to the height of the user being detected, the control unit sets a maximum open angle of the trunk door corresponding to the height of the user, and when the user opens the trunk door, the control unit stops to provide the support for the assist torque after the open angle of the trunk door reaches the set maximum open angle of the opened trunk door.

10. The trunk door opening/closing assistance method as claimed in claim 9, wherein the angle detection part detects the angle of the trunk door opened or closed between a maximum closed angle when the trunk door is in a lock state and a maximum open angle when the trunk door is in an open state.

11. The trunk door opening/closing assistance method as claimed in claim 9, wherein when the trunk door is opened, the user height detection part detects, by at least one sensor installed on the trunk door, a height up to the top of the head of the user or a height up to an end of an upwardly stretched hand of the user.

12. The trunk door opening/closing assistance method as claimed in claim 7, wherein when a torque is not applied by the user while the trunk door is opened and closed by providing the assist torque support, the control unit stops the support for the assist torque to stop the opening or closing of the trunk door.

13. The trunk door opening/closing assistance method as claimed in claim 7, wherein when the support for the assist torque is provided to open and close the trunk door,
    the control unit detects the height of the user who opens and closes the trunk door, and sets a maximum open angle of the trunk door corresponding to the height of the user;
    in response to the trunk door being opened by the user, the control unit sets, by the assist torque, a total torque for opening the trunk door up to a maximum angle after the set trunk door maximum open angle is reached and thereby automatically opens the trunk door up to a maximum angle; and when the user intends to close the trunk door, the control unit automatically closes the trunk door opened up to the maximum open angle set by taking into account the height of the user.

14. The trunk door opening/closing assistance method as claimed in claim 13, wherein the control unit determines a case of closing the trunk door by the user by detecting at least one of the user's input of a trunk button in a vehicle remote controller, the user's touch of a specific position in the trunk, and an elapse of a specific time after the trunk is opened up to the maximum open angle.

* * * * *